United States Patent
Sato et al.

(10) Patent No.: US 10,488,609 B2
(45) Date of Patent: Nov. 26, 2019

(54) INTERMITTENT-CONNECTION-TYPE OPTICAL FIBER RIBBON AND OPTICAL CABLE

(71) Applicant: SUMITOMO ELECTRIC INDUSTRIES, LTD., Osaka-shi, Osaka (JP)

(72) Inventors: Fumiaki Sato, Yokohama (JP); Kenta Tsuchiya, Yokohama (JP); Keisuke Okada, Yokohama (JP); Yoshiaki Nagao, Yokohama (JP); Nobuyuki Suzuki, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/771,797

(22) PCT Filed: Jan. 11, 2017

(86) PCT No.: PCT/JP2017/000604
§ 371 (c)(1),
(2) Date: Apr. 27, 2018

(87) PCT Pub. No.: WO2017/122665
PCT Pub. Date: Jul. 20, 2017

(65) Prior Publication Data
US 2018/0314020 A1 Nov. 1, 2018

(30) Foreign Application Priority Data
Jan. 13, 2016 (JP) .................................. 2016-004683

(51) Int. Cl.
*G02B 6/44* (2006.01)

(52) U.S. Cl.
CPC ............. *G02B 6/4403* (2013.01); *G02B 6/44* (2013.01); *G02B 6/4409* (2013.01)

(58) Field of Classification Search
CPC .......................... G02B 6/4403; G02B 6/4409
See application file for complete search history.

(56) References Cited

U.S. PATENT DOCUMENTS

| | | | |
|---|---|---|---|
| 8,787,718 B2 * | 7/2014 | Tanabe ................. | G02B 6/4405 385/102 |
| 10,007,078 B2 * | 6/2018 | Sato ..................... | G02B 6/4403 |

(Continued)

FOREIGN PATENT DOCUMENTS

| | | |
|---|---|---|
| JP | 2007-279226 A | 10/2007 |
| JP | 2010-8923 A | 1/2010 |

(Continued)

*Primary Examiner* — Omar R Rojas
(74) *Attorney, Agent, or Firm* — Drinker Biddle & Reath LLP

(57) ABSTRACT

An intermittent-connection-type optical fiber ribbon in which a plurality of optical fiber core wires are disposed in parallel, and which includes: a connecting part where adjacent optical fiber core wires are connected; and a non-connecting part where adjacent optical fiber core wires are not connected, the connecting parts and the non-connecting parts are provided intermittently in a longitudinal direction, the non-connecting parts are not provided in the longitudinal direction between two the optical fiber core wires, the connecting part is recessed, and in a case where, in the longitudinal direction, a is length of the connecting part, b is length of a part where the non-connecting part between different optical fiber core wires overlap, c is length of the non-connecting part, and p is an interval of the connecting parts, $c/a \geq 1.5$, $b \leq 50$ mm, and $(c/a) \times p \geq 200$ mm are set.

4 Claims, 5 Drawing Sheets

(56) References Cited

U.S. PATENT DOCUMENTS

2014/0016905 A1 1/2014 Tanabe et al.
2014/0314382 A1* 10/2014 Sato .................... G02B 6/4403
                                                             385/103

FOREIGN PATENT DOCUMENTS

| JP | 2012-88445 A | 5/2012 |
| JP | 2012-208363 A | 10/2012 |
| JP | A-2014-016530 | 1/2014 |
| JP | 2014-228688 A | 12/2014 |
| WO | WO-2012/131811 A1 | 10/2012 |

* cited by examiner

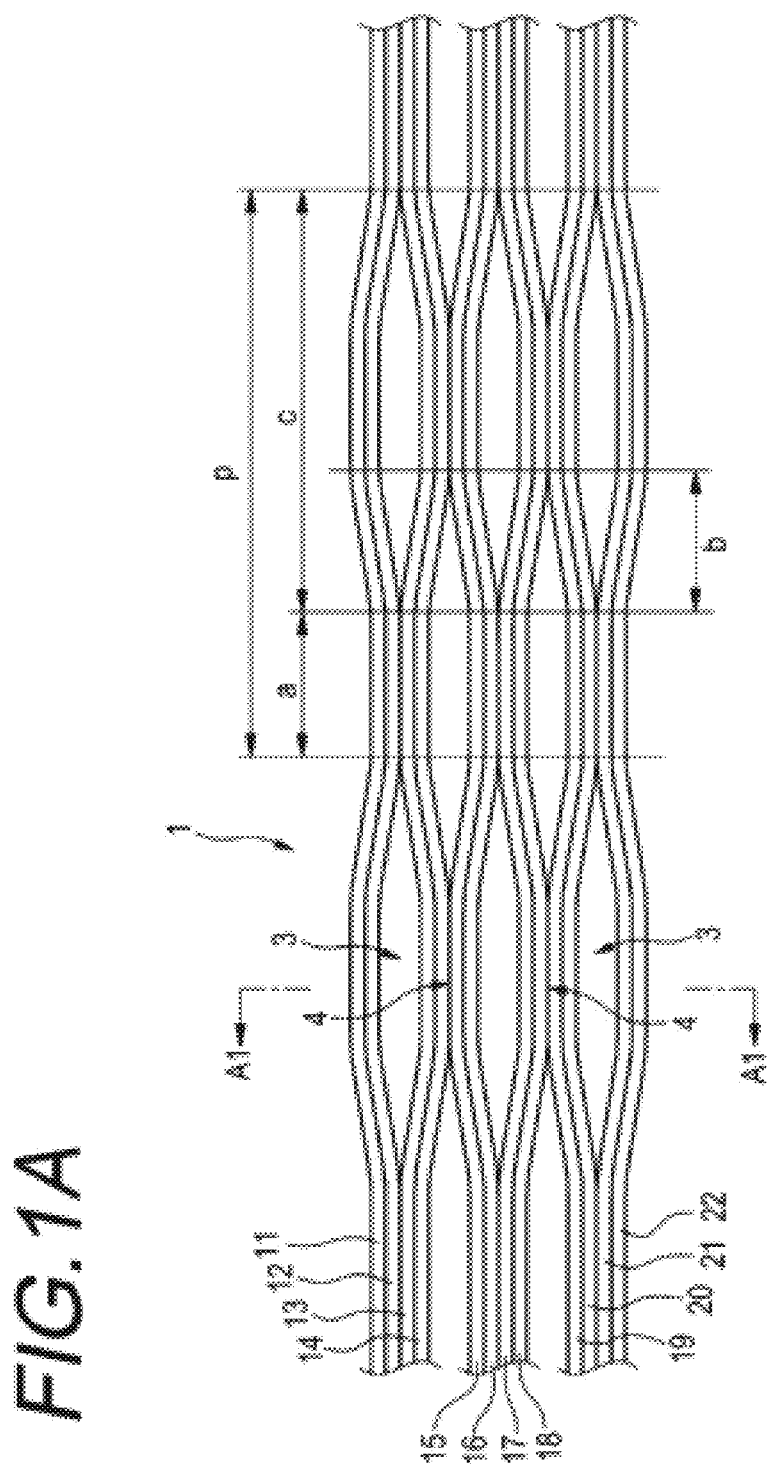

INTERMITTENT-CONNECTION-TYPE OPTICAL FIBER RIBBON AND OPTICAL CABLE

TECHNICAL FIELD

The present invention relates to an intermittent-connection-type optical fiber ribbon and an optical cable.

This application claims priority from Japanese Patent Application No. 2016-4683, filed on Jan. 13, 2016, the entire subject matter of which is incorporated herein by reference.

BACKGROUND ART

Patent Documents 1 and 2 disclose an intermittent-connection-type optical fiber ribbon in which a non-connecting part (slit) is intermittently formed in a longitudinal direction.

CITATION LIST

Patent Documents

Patent Document 1: JP-A-2007-279226
Patent Document 2: JP-A-2010-8923

SUMMARY OF INVENTION

An intermittent-connection-type optical fiber ribbon according to an embodiment of the present disclosure is covered with a connecting resin in a state where a plurality of optical fiber core wires are disposed in parallel, the intermittent-connection-type optical fiber ribbon includes: a connecting part where adjacent optical fiber core wires are connected to each other; and a non-connecting part where adjacent optical fiber core wires are not connected to each other, the connecting parts and the non-connecting parts are provided intermittently in a longitudinal direction, the non-connecting parts are not provided in the longitudinal direction between two of at least some of the optical fiber core wires, the connecting part is recessed, and in a case where a is length of the connecting part in the longitudinal direction, b is length of a part where the non-connecting part between different optical fiber core wires overlap in the longitudinal direction, c is length of the non-connecting part in the longitudinal direction, and p is an interval of the connecting parts in the longitudinal direction, $c/a \geq 1.5$, $b \leq 50$ mm, and $(c/a) \times p \geq 200$ mm are set.

An optical cable according to the embodiment of the present disclosure includes: a cylindrical tube; and a plurality of the above intermittent-connection-type optical fiber ribbons, and the plurality of intermittent-connection-type optical fiber ribbons are covered with the tube in a state of being bundled.

An optical cable according to another embodiment of the present disclosure includes: a slot rod that includes a plurality of slot grooves; and a plurality of the above intermittent-connection-type optical fiber ribbons, and the plurality of intermittent-connection-type optical fiber ribbons are housed separately in the slot grooves.

BRIEF DESCRIPTION OF DRAWINGS

FIG. 1A is a plan view showing an example of a configuration of an intermittent-connection-type optical fiber ribbon according to an embodiment.

DESCRIPTION OF EMBODIMENTS

Figure 1B:
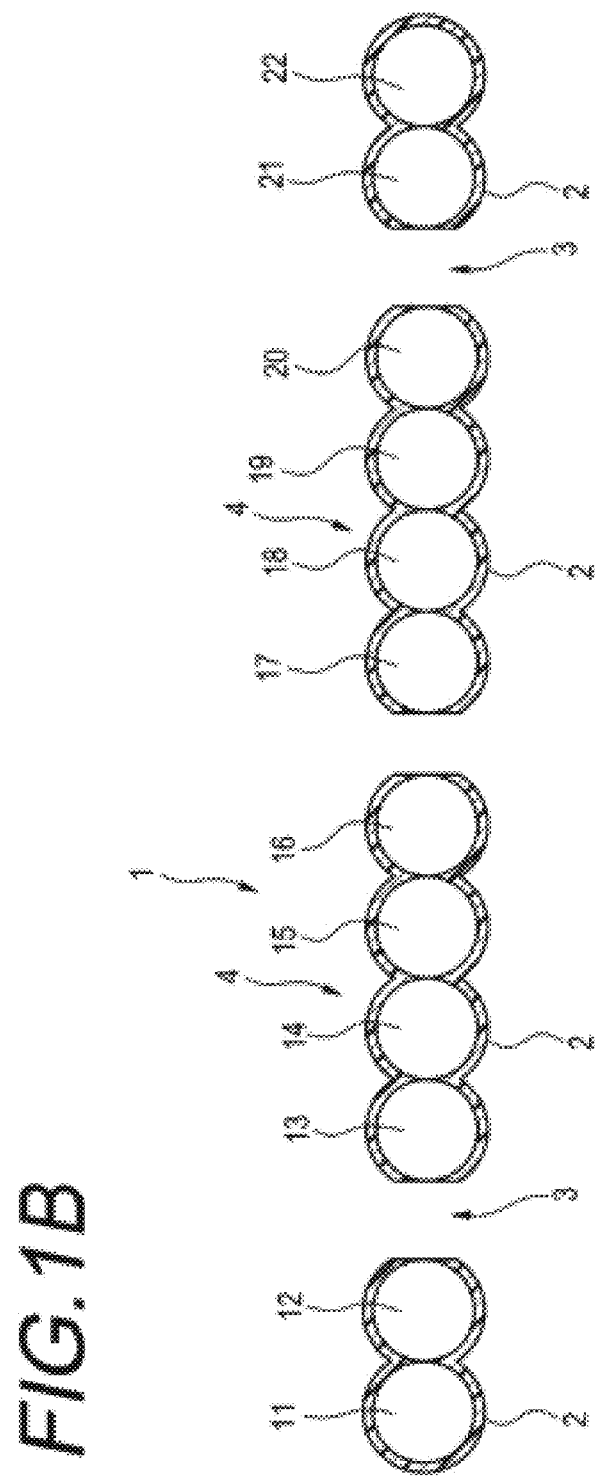
FIG. 1B is a cross-sectional view showing the example of a configuration of an intermittent-connection-type optical fiber ribbon according to the embodiment.

[Problems to be Solved by the Present Disclosure]

For example, in the intermittent-connection-type optical fiber ribbon disclosed in Patent Documents 1 and 2, there may be a case where the non-connecting part is longer than a connecting part and a proportion of the non-connecting part increases. In this way, deterioration of transmission characteristics of optical fibers can be suppressed since flexibility of the ribbon improves as the proportion of the non-connecting part increases. However, the optical fiber core wires tend to loosen when the proportion of the non-connecting part increases. For this reason, when such a ribbon is set in a holder of a fusion splicer for fusion-splicing, there is a risk that the optical fiber core wires move, an arrangement of the optical fiber core wires is changed, the optical fiber core wires shift from a groove of the holder and ride on the connecting part, and that a defect occurs during the fusion splicing.

Therefore, an object of the present disclosure is to provide an intermittent-connection-type optical fiber ribbon and an optical cable in which deterioration of transmission characteristics of optical fibers can be suppressed and a defect during fusion splicing can be prevented from occurring.

[Effect of the Present Disclosure]

According to the present disclosure, deterioration of transmission characteristics of optical fibers can be suppressed and a defect during fusion splicing can be prevented from occurring.

[Description of Embodiments of the Present Invention]

First, embodiments of the present invention will be listed and described.

An intermittent-connection-type optical fiber ribbon according to an embodiment of the present invention is (1) an intermittent-connection-type optical fiber ribbon is covered with a connecting resin in a state where a plurality of optical fiber core wires are disposed in parallel, the intermittent-connection-type optical fiber ribbon includes: a connecting part where adjacent optical fiber core wires are connected to each other; and a non-connecting part where adjacent optical fiber core wires are not connected to each other, the connecting parts and the non-connecting parts are provided intermittently in a longitudinal direction, the non-connecting parts are not provided in the longitudinal direction between two of at least some of the optical fiber core wires, the connecting part is recessed, and in a case where a is length of the connecting part in the longitudinal direction, b is length of a part where the non-connecting part between different optical fiber core wires overlap in the longitudinal direction, c is length of the non-connecting part in the longitudinal direction, and p is an interval of the connecting parts in the longitudinal direction, $c/a \geq 1.5$, $b \leq 50$ mm, and $(c/a) \times p \geq 200$ mm are set.

As described above, deterioration of transmission characteristics of optical fibers can be suppressed by setting that $c/a \geq 1.5$ and $(c/a) \times p \geq 200$ mm, and a defect during fusion splicing can be prevented from occurring by setting that $b \leq 50$ mm.

Further, since the connecting part is recessed, separating an optical fiber core wire from the optical fiber core wires can be made easy.

(2) The intermittent-connection-type optical fiber ribbon according to (1), a value of $(c/a) \times p$ is 400 mm or more. Accordingly, deterioration of transmission characteristics of optical fibers can be further suppressed.

(3) The intermittent-connection-type optical fiber ribbon according to (1) or (2), adjacent two optical fibers are in contact with each other partially in the longitudinal direction.

Since adjacent two optical fibers are in contact with each other, an interval of adjacent optical fibers can be made constant, and accordingly the fusion splicing can be made more reliable. Further, since adjacent optical fiber core wires are disposed to be partially in contact with each other, a sectional area of the optical fiber ribbon can be reduced, and a multi-core optical cable can be realized.

An optical cable according to an embodiment of the present invention is (4) an optical cable includes: a cylindrical tube; and a plurality of intermittent-connection-type optical fiber ribbons according to any one of (1) to (3), the plurality of intermittent-connection-type optical fiber ribbons are covered with the tube in a state of being bundled.

Deterioration of transmission characteristics of the optical cable covered by the cylindrical tube can be suppressed, and a defect during fusion splicing can be prevented from occurring.

(5) An optical cable includes: a slot rod that includes a plurality of slot grooves; and a plurality of intermittent-connection-type optical fiber ribbons according to any one of (1) to (3), the plurality of intermittent-connection-type optical fiber ribbons are housed separately in the slot grooves.

In the optical cable in which the intermittent-connection-type optical fiber ribbons are housed in the slot grooves, deterioration of transmission characteristics of optical fibers can be suppressed and a defect during fusion splicing can be prevented from occurring.

[Details of Embodiments of the Present Invention]

A specific embodiment of an intermittent-connection-type optical fiber ribbon and an optical cable according to an embodiment of the present invention will be described with reference to drawings hereinafter.

Additionally, the present invention is not limited to these examples but indicated by the scope of claims, and is intended to include meanings equivalent to the scope of claims and all modifications within the scope.

FIG. 1A is a plan view showing an example of a configuration of an intermittent-connection-type optical fiber ribbon according to the embodiment. FIG. 1B is a cross-sectional view at a position A1 in FIG. 1A.

As shown in FIGS. 1A and 1B, an intermittent-connection-type optical fiber ribbon 1 includes a plurality (12 pieces in the example of FIGS. 1A and 1B) of optical fiber core wires 11 to 22 which are disposed in parallel. These optical fiber core wires 11 to 22 are single coated optical fibers. Additionally, coatings of the optical fiber core wires 11 to 22 may be colored in different colors so that the optical fiber core wires can be identified with each other.

The plurality of optical fiber core wires 11 to 22 disposed in parallel are coated, on surfaces thereof, with a connecting resin 2 for connecting the optical fiber core wires to each other, such that the optical fiber core wires 11 to 22 are aligned in parallel in a ribbon form. The connecting resin 2 is, for example, an ultraviolet-curable resin or a thermosetting resin. Here, the connecting resin 2 is preferably a resin having good releasability in order to facilitate separating an optical fiber core wire from the optical fiber core wires 11 to 22.

The intermittent-connection-type optical fiber ribbon 1 is provided with, via the connecting resin 2, a connecting part 4 where adjacent optical fiber core wires are connected to each other and a non-connecting part 3 where adjacent optical fiber core wires are not connected to each other intermittently in a longitudinal direction, and the connecting part 4 is recessed. Further, the non-connecting part 3 is not provided in the longitudinal direction between two of at least some of the optical fiber core wires. For example, in FIG. 1, the non-connecting part 3 is not provided between the optical fiber core wires 11 and 12, 13 and 14, 15 and 16, 17 and 18, 19 and 20, and 21 and 22.

Generally, flexibility of an optical fiber ribbon of intermittent connection type ribbon improves as a proportion of a non-connecting part increases, and deterioration of transmission characteristics of optical fibers can be suppressed. However, the optical fiber core wires tend to loosen as the proportion of the non-connecting part increases, and the optical fiber core wires move easily when the ribbon is set in a holder of a fusion splicer during fusion splicing. For this reason, following defects occur, and fusion splicing of the optical fiber ribbons with each other cannot be performed normally.

Figure 2A:
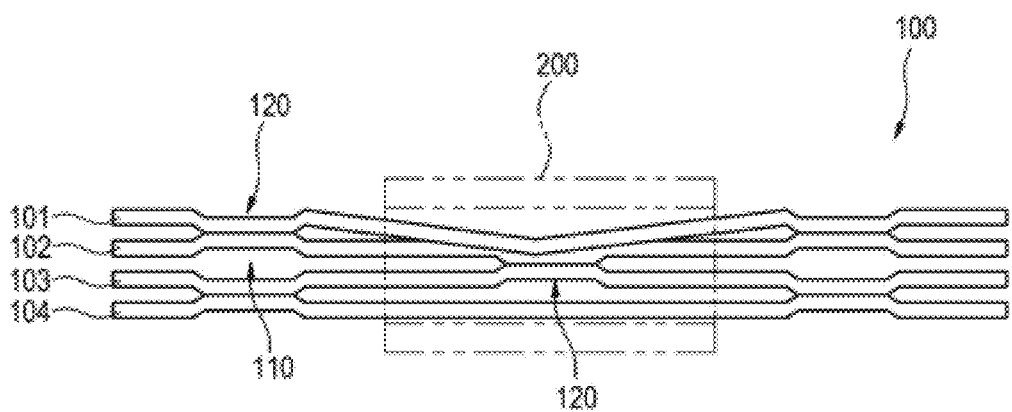
FIG. 2A is an illustrative view of a case example 1 of a defect when a general optical fiber ribbon of intermittent connection type is set in a holder of a fusion splicer during fusion splicing.
Figure 2B:
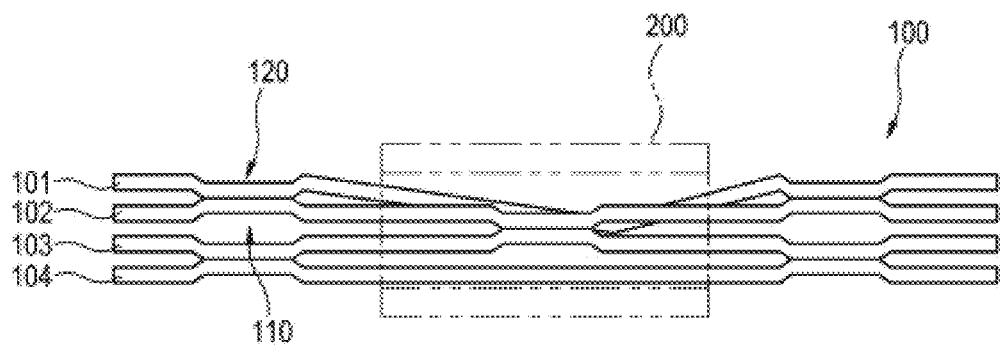
FIG. 2B is an illustrative view of a case example 2 of a defect when a general optical fiber ribbon of intermittent connection type is set in a holder of a fusion splicer during fusion splicing.
Figure 2C:
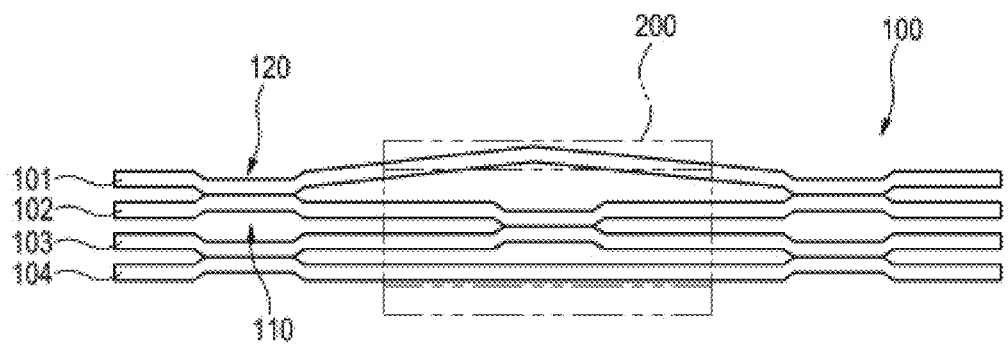
FIG. 2C is an illustrative view of a case example 3 of a defect when a general optical fiber ribbon of intermittent connection type is set in a holder of a fusion splicer during fusion splicing.

Case examples of a defect when a conventional optical fiber ribbon of intermittent connection type is set in a holder of a fusion splicer during fusion splicing are shown in FIGS. 2A, 2B, and 2C. FIGS. 2A, 2B, and 2C schematically show cases of a defect occurred when a conventional optical fiber ribbon 100 of intermittent connection type is set in a holder 200 of a fusion splicer during fusion splicing. Here, in order to facilitate understanding of the description, the optical fiber ribbon 100 in FIGS. 2A, 2B, and 2C is configured such that single optical fiber core wires 101 to 104 are disposed in parallel, and a non-connecting part 110 is intermittently provided between all the optical fiber core wires.

For example, in a case example 1 shown in FIG. 2A, when the optical fiber ribbon 100 is set in the holder 200, the optical fiber core wire 101 adjacent to a connecting part 120 rides on the connecting part 120.

In a case example 2 shown in FIG. 2B, when the optical fiber ribbon 100 is set in the holder 200, arrangement of the optical fiber core wires 101 and 102 between adjacent optical fiber core wires cross in the holder 200.

In a case example 3 shown in FIG. 2C, the optical fiber core wire 101 gets out of a groove of the holder 200.

When a case of the above defects occurs, fusion splicing between optical fiber ribbons cannot be performed normally.

The inventors of the present invention has conducted an experiment to discuss a structure of an optical fiber ribbon of intermittent connection type, in which deterioration of transmission characteristics of optical fiber core wires can be suppressed and a defect between optical fiber ribbons during fusion splicing can be prevented from occurring. Details of the experiment will be described later. It has been found as a result that, in a case where the intermittent-connection-type optical fiber ribbon 1 shown in FIG. 1 has a specific range of structural factors, deterioration of transmission characteristics of optical fibers can be suppressed and a defect between optical fiber ribbons during fusion splicing can be prevented from occurring.

An optical fiber ribbon of intermittent connection type has generally focused on a fact that a connecting part and a non-connecting part of optical fiber core wires are alternately provided at the same pitch in a longitudinal direction, and the above structural factors are discussed regarding the following parameters.

A parameter "a" is length of a connecting part in the longitudinal direction, "b" is length of a part where non-connecting parts between different optical fiber core wires overlap in the longitudinal direction, "c" is length of a non-connecting part in the longitudinal direction, "p" is an interval (pitch) in which connecting parts are provided in the longitudinal direction, and "c/a" is a ratio (non-connecting part ratio) of a non-connecting part of the optical fiber core wires in the longitudinal direction.

Regarding the above parameters, the intermittent-connection-type optical fiber ribbon 1 according to the embodiment has a structure which satisfies conditions that c/a≥1.5, b≤50 mm, and (c/a)×p≥200 mm. Further, in order to make the fusion splicing more reliable, it is preferable that, as shown in FIG. 1B, two optical fibers of the intermittent-connection-type optical fiber ribbon 1, which are partially adjacent in the longitudinal direction (in this case, the connecting part 4), are connected via the connecting resin 2, such that the optical fibers are in contact with each other.

Figure 3:
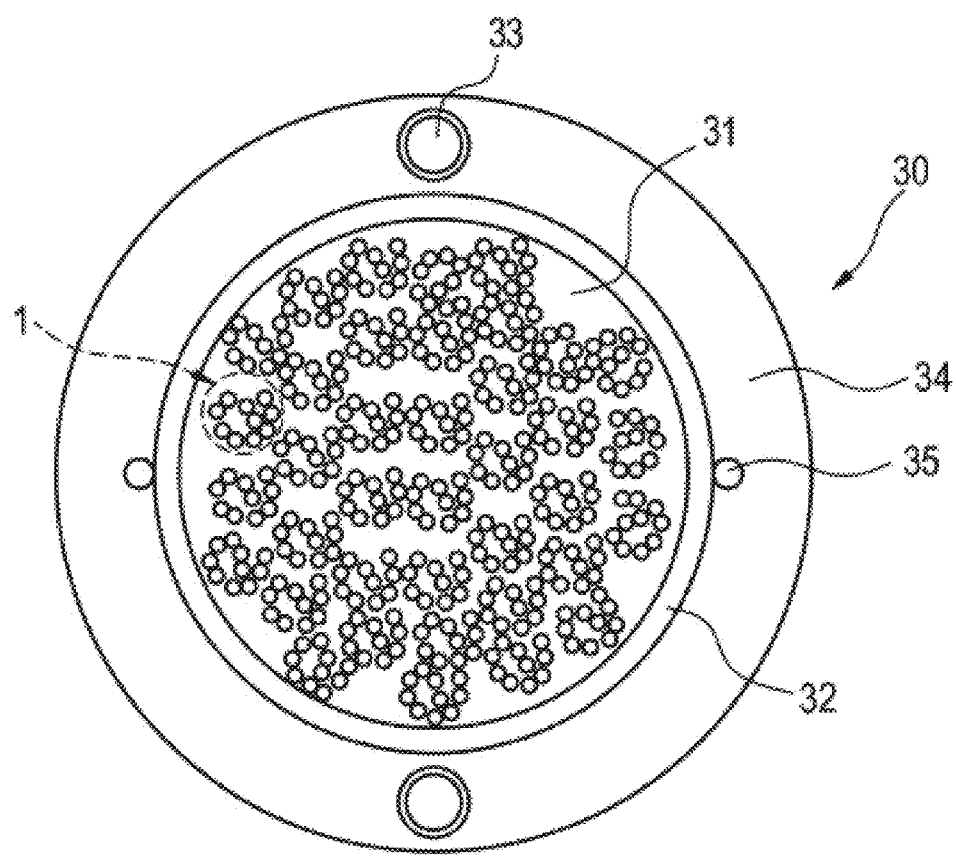
FIG. 3 shows an example of an optical cable of slot-less type using the optical fiber ribbon of intermittent connection type according to the embodiment.
Figure 4:
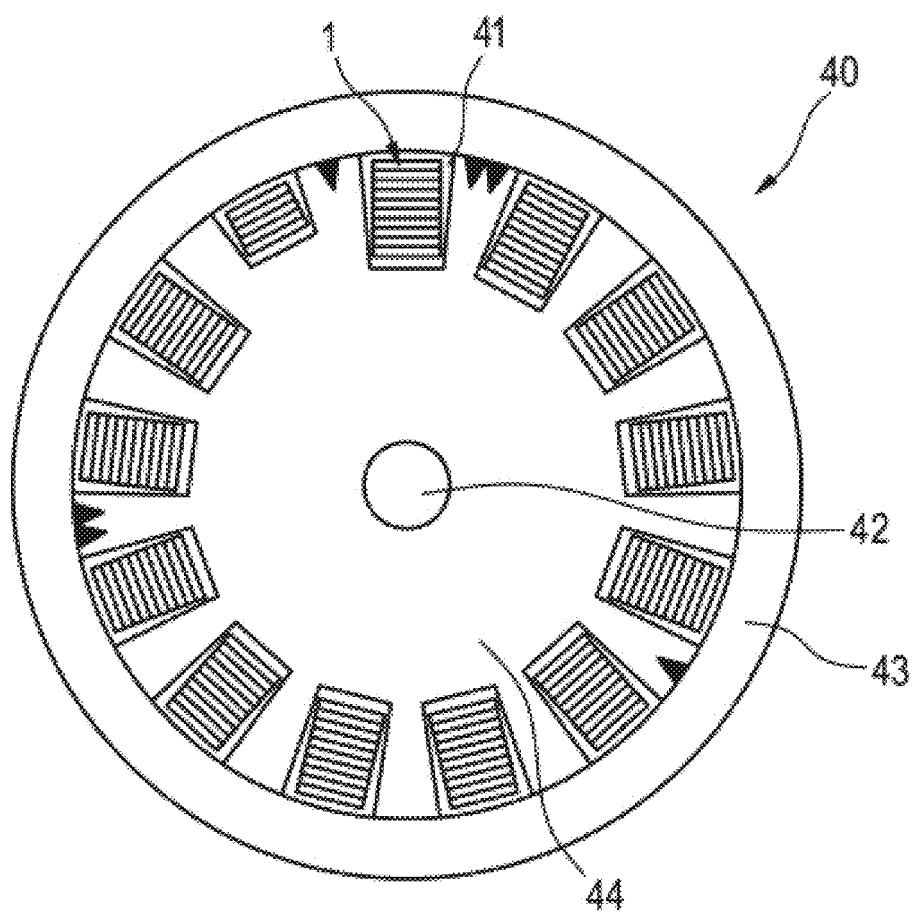
FIG. 4 shows an example of an optical cable of ribbon slot type using the optical fiber ribbon of intermittent connection type according to the embodiment.

Next, an optical cable according to the embodiment will be described with reference to the FIGS. 3 and 4. FIG. 3 shows an example of an optical cable of slot-less type using the intermittent-connection-type optical fiber ribbon 1 according to the embodiment. FIG. 4 shows an example of an optical cable of ribbon slot type using the intermittent-connection-type optical fiber ribbon 1 according to the embodiment.

The optical cable shown in FIG. 3 is an optical cable 30 of slot-less type which includes a cylindrical tube 32 and a plurality of intermittent-connection-type optical fiber ribbons 1. The plurality of intermittent-connection-type optical fiber ribbons 1 are bundled by an interposition 31 such as an aramid fiber. Additionally, a water absorption yarn may be inserted in a case where waterproof property is required. The optical cable 30 has a structure in which a resin around the intermittent-connection-type optical fiber ribbons 1 which serves as the tube 32 is extruded while the intermittent-connection-type optical fiber ribbons 1 are stranded. The tube 32, together with a tension member 33, is covered by a sheath 34. The resin serving as the tube 52 uses a hard material such as PBT and HDPE. Here, 35 is a tearing string.

The optical cable shown in FIG. 4 is an optical cable 40 of ribbon slot type which includes a slot rod 44 having a plurality of slot grooves 41 and intermittent-connection-type optical fiber ribbons 1. The optical cable 40 has a structure in which the slot grooves 41 are radially provided in the slot rod 44 which has a tension member 42 at a center thereof. The plurality of intermittent-connection-type optical fiber ribbons 1 are housed in a state of being laminated in the plurality of slot grooves 41. A sheath 43 is formed around the slot rod 44.

EXAMPLE

Intermittent-connection-type optical fiber ribbons (Ribbons No. 1 to 24) are experimentally produced, in which each parameter of "a" (length of a connecting part in the longitudinal direction), "b" (length of a part where non-connecting parts between different optical fiber core wires overlap in the longitudinal direction), and "c" (length of a non-connecting part in the longitudinal direction) are changed. Further, a transmission characteristic due to transmission losses measured by using these intermittent-connection-type optical fiber ribbons in a 432-core optical cable 30 of slot-less type and a defect between optical fiber ribbons during fusion splicing are examined.

A result thereof is shown in following Table 1.

TABLE 1

| Ribbon No. | a (mm) | c (mm) | b (mm) | p (mm) | c/a | p × (c/a) | transmission losses (dB/km) | defect during fusion splicing |
|---|---|---|---|---|---|---|---|---|
| 1 | 25 | 25 | 0 | 50 | 1 | 50 | 1.20 | no defect |
| 2 | 50 | 50 | 0 | 100 | 1 | 100 | 1.10 | no defect |
| 3 | 75 | 75 | 0 | 150 | 1 | 150 | 0.85 | no defect |
| 4 | 100 | 100 | 0 | 200 | 1 | 200 | 0.50 | no defect |
| 5 | 20 | 30 | 5 | 50 | 1.5 | 75 | 1.10 | no defect |
| 6 | 40 | 60 | 10 | 100 | 1.5 | 150 | 0.80 | no defect |
| 7 | 60 | 90 | 15 | 150 | 1.5 | 225 | 0.21 | no defect |
| 8 | 80 | 120 | 20 | 200 | 1.5 | 300 | 0.20 | no defect |
| 9 | 17 | 33 | 8 | 50 | 2 | 100 | 1.00 | no defect |
| 10 | 33 | 67 | 17 | 100 | 2 | 200 | 0.21 | no defect |
| 11 | 50 | 100 | 25 | 150 | 2 | 300 | 0.20 | no defect |
| 12 | 67 | 133 | 33 | 200 | 2 | 400 | 0.20 | no defect |
| 13 | 13 | 38 | 13 | 50 | 3 | 150 | 0.80 | no defect |
| 14 | 25 | 75 | 25 | 100 | 3 | 300 | 0.20 | no defect |
| 15 | 38 | 113 | 38 | 150 | 3 | 450 | 0.20 | no defect |
| 16 | 50 | 150 | 50 | 200 | 3 | 600 | 0.20 | no defect |
| 17 | 10 | 40 | 15 | 50 | 4 | 200 | 0.21 | no defect |
| 18 | 20 | 80 | 30 | 100 | 4 | 400 | 0.20 | no defect |
| 19 | 30 | 120 | 45 | 150 | 4 | 600 | 0.20 | no defect |
| 20 | 40 | 160 | 60 | 200 | 4 | 800 | 0.19 | defect occurred |
| 21 | 8 | 42 | 17 | 50 | 5 | 250 | 0.20 | no defect |
| 22 | 17 | 83 | 33 | 100 | 5 | 500 | 0.19 | no defect |
| 23 | 25 | 125 | 50 | 150 | 5 | 750 | 0.19 | no defect |
| 24 | 33 | 167 | 67 | 200 | 5 | 1000 | 0.19 | defect occurred |

As shown in the above Table 1, a minimum value of transmission losses of Ribbons No. 1 to 24 is 0.19 dB/km, and a low level of transmission losses of 0.19 dB/km to 0.21 dB/km in vicinity of the minimum value and a high level of transmission losses of 0.80 dB/km to 1.20 dB/km which greatly exceeds 0.21 dB/km have been found. Here, it is assumed that the transmission characteristic is acceptable with the above low level.

Further, a ribbon having a transmission loss of 0.21 dB/km or less and no defect during fusion splicing is assumed as an acceptable product.

Among Ribbons No. 1 to 24 in Table 1, acceptable products are No. 7, 8, 10 to 12, 14 to 19, and 21 to 23.

Ribbons whose non-connecting part ratios c/a are 1 (Ribbons No. 1 to 4) all have the above high level of transmission losses. Further, regarding ribbons with c/a which is equal to or larger than 1.5, the above low level have been found. In terms of (c/a)×p, ribbons below 200 mm (Ribbons No. 9, 13) have the above high level of transmission losses.

Meanwhile, a defect during fusion splicing is considered to be related to the parameter "b" (length of a part where non-connecting parts between different optical fiber core wires overlap in the longitudinal direction). A defect occurred during fusion splicing of Ribbon No. 9 having "b" of 60 mm and Ribbon No. 13 having "b" of 67 mm. In contrast, no defect occurred during fusion splicing of ribbons having "b" which is equal to or less than 50 mm.

Therefore, a ribbon as an acceptable product satisfies the conditions that $c/a \geq 1.5$, $b \leq 50$ mm, and $(c/a) \times p \geq 200$ mm. From the above discussion, the intermittent-connection-type optical fiber ribbon 1 according to the embodiment satisfies the above condition to be an acceptable product. Among the above acceptable products, ribbons satisfying a condition that $(c/a) \times p \geq 400$ mm have transmission losses of 0.20 dB/km or less, and deterioration of transmission characteristics of optical fibers can be further suppressed.

According to the intermittent-connection-type optical fiber ribbon 1 of the above embodiment described in detail, deterioration of transmission characteristics of the optical fiber core wires 11 to 22 can be suppressed by assuming that $c/a \geq 1.5$ and $(c/a) \times p \geq 200$ mm, and a defect during fusion splicing of the intermittent-connection-type optical fiber ribbon 1 can be prevented from occurring by assuming that $b \leq 50$ mm.

The intermittent-connection-type optical fiber ribbon 1 is preferable to have a value of $(c/a) \times p$ of 400 mm or more, and deterioration of transmission characteristics of the optical fiber core wires 11 to 22 can be further suppressed.

Further, in order to make fusion splicing more reliable, it is preferable that two optical fibers of the intermittent-connection-type optical fiber ribbon 1, which are partially adjacent in the longitudinal direction, are preferably connected via the connecting resin 2, such that the optical fibers are in contact with each other.

Since the optical cable 30 according to the embodiment includes the intermittent-connection-type optical fiber ribbons 1 which are bundled, and is covered by the cylindrical tube 32, deterioration of transmission characteristics of the optical cable 30 can be suppressed. Further, a defect when taking out and fusion-splicing the intermittent-connection-type optical fiber ribbons 1 can be prevented from occurring.

Since the optical cable 40 according to the embodiment includes the intermittent-connection-type optical fiber ribbons 1 which are housed in the slot grooves 41, deterioration of transmission characteristics of the optical cable 40 can be suppressed. Further, a defect when taking out and fusion-splicing the intermittent-connection-type optical fiber ribbons 1 can be prevented from occurring.

DESCRIPTION OF REFERENCE NUMERALS 1 intermittent-connection-type optical fiber ribbon
2 connecting resin
3 non-connecting part
4 connecting part
11 to 22 optical fiber core wire
30, 40 optical cable
31 interposition
32 tube
33, 42 tension member
34, 43 sheath
35 tearing string
41 slot groove
44 slot rod
100 conventional optical fiber ribbon of intermittent connection type
101 to 104 optical fiber core wire
110 non-connecting part
120 connecting part

The invention claimed is:

1. An intermittent-connection-type optical fiber ribbon which is covered with a connecting resin in a state where a plurality of optical fiber core wires are disposed in parallel, the intermittent-connection-type optical fiber ribbon comprising: a connecting part where adjacent optical fiber core wires are connected to each other; and a non-connecting part where adjacent optical fiber core wires are not connected to each other,
   wherein the connecting parts and the non-connecting parts are provided intermittently in a longitudinal direction,
   wherein each of the plurality of optical fiber core wires is paired with an adjacent optical fiber core wire, and the non-connecting parts are not provided between each respective pair in the longitudinal direction throughout the length of the optical fiber ribbon,
   wherein the connecting part is recessed, and
   wherein in a case where a is length of the connecting part in the longitudinal direction, b is length of a part where the non-connecting part between different optical fiber core wires overlap in the longitudinal direction, c is length of the non-connecting part in the longitudinal direction, and p is an interval of the connecting parts in the longitudinal direction, $a \geq 8$ mm, $c/a \geq 1.5$, $b \leq 50$ mm, and 400 mm$\leq (c/a) \times p \leq 750$ mm are set.

2. The intermittent-connection-type optical fiber ribbon according to claim 1,
   wherein adjacent two optical fibers are in contact with each other partially in the longitudinal direction.

3. An optical cable comprising:
   a cylindrical tube; and
   a plurality of intermittent-connection-type optical fiber ribbons according to claim 1,
   wherein the plurality of intermittent-connection-type optical fiber ribbons are covered with the tube in a state of being bundled.

4. An optical cable comprising:
   a slot rod that includes a plurality of slot grooves; and
   a plurality of intermittent-connection-type optical fiber ribbons according to claim 1, and
   wherein the plurality of intermittent-connection-type optical fiber ribbons are housed separately in the slot grooves.

* * * * *